(12) United States Patent
Scherzinger

(10) Patent No.: US 7,978,128 B2
(45) Date of Patent: Jul. 12, 2011

(54) LAND SURVEY SYSTEM

(75) Inventor: Bruno Scherzinger, Richmond Hill (CA)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 12/930,569

(22) Filed: Jan. 11, 2011

(65) Prior Publication Data

US 2011/0102255 A1 May 5, 2011

Related U.S. Application Data

(60) Continuation of application No. 12/590,908, filed on Nov. 16, 2009, which is a continuation of application No. 12/313,560, filed on Nov. 20, 2008, now Pat. No. 7,619,561, which is a division of application No. 11/303,676, filed on Dec. 15, 2005, now Pat. No. 7,541,974.

(51) Int. Cl.
*G01S 19/40* (2010.01)

(52) U.S. Cl. .................................... 342/357.23

(58) Field of Classification Search ............. 342/357.23, 342/357.28
See application file for complete search history.

(56) References Cited

U.S. PATENT DOCUMENTS

| | | | |
|---|---|---|---|
| 5,268,695 A | 12/1993 | Dentinger et al. | |
| 5,337,149 A * | 8/1994 | Kozah et al. | 356/601 |
| 5,561,432 A | 10/1996 | Knight | |
| 5,563,608 A * | 10/1996 | Tachita et al. | 342/357.28 |
| 6,266,628 B1 | 7/2001 | Huep et al. | |
| 6,400,447 B1 | 6/2002 | Kirk et al. | |
| 6,628,308 B1 | 9/2003 | Greenberg et al. | |
| 6,834,234 B2 | 12/2004 | Scherzinger et al. | |
| 6,853,909 B2 | 2/2005 | Scherzinger | |
| 7,076,365 B2 * | 7/2006 | Tzamaloukas | 701/217 |
| 7,188,026 B2 | 3/2007 | Tzamaloukas | |
| 7,373,242 B2 | 5/2008 | Yamane | |
| 7,774,158 B2 | 8/2010 | Goncalves et al. | |
| 2003/0182053 A1 | 9/2003 | Swope et al. | |
| 2004/0012520 A1 | 1/2004 | Talbot et al. | |
| 2004/0168148 A1 | 8/2004 | Goncalves et al. | |
| 2005/0060093 A1 | 3/2005 | Ford et al. | |
| 2005/0125142 A1 * | 6/2005 | Yamane | 701/200 |
| 2010/0141759 A1 | 6/2010 | Scherzinger | |

OTHER PUBLICATIONS

International Search Report dated Dec. 12, 2008, Appln. No. PCt/US2006/047721.

George Siouris, *Aerospace Avionics Systems, A Modern Synthesis*, Academic Press 1993.

Oleg Salychev, *Inertial Systems in Navigation and Geophysics*, Bauman MSTU Press, Moscow 1998, Chapters 1-10.

(Continued)

*Primary Examiner* — Thomas H Tarcza
*Assistant Examiner* — Harry Liu
(74) *Attorney, Agent, or Firm* — William E. Felton, Esq.; Cooper & Dunham LLP

(57) ABSTRACT

A method and system obtains precise survey-grade position data of target points in zones where precise GPS data cannot be obtained, due to natural or man-made objects such as foliage and buildings. The system comprises position measurement components such as a GPS receiver, together with an inertial measurement unit (IMU) and an electronic distance meter (EDM) or an image capture device all mounted on a survey pole. The system and method obtains GPS data when outside the zone and uses the other position measurement systems, such as the IMU, inside the zone to traverse to a target point. The EDM or the image capture device may be used within or without the zone to obtain data to reduce accumulated position errors.

14 Claims, 8 Drawing Sheets

OTHER PUBLICATIONS

Principals of Robot Motion, by Howie Choset, et al. The MIT Press (Jun. 4, 2005), ISBN: 0262033275.

Introduction to Autonomous Mobile Roberts (Intelligent Robotics and Autoromous Agents), by Roland Siegwart and Illah R. Nourbakhsh, The MIT Press (Apr. 1, 2004), ISBN: 026219502X.

http://en.wilkipedia.org/wiki/Simultaneous localization and mapping.

http://www.cas.kth.se/SLAM/Presentations/hdw-slides.pdf.

http://www.robots.ox.ac.uk/ActiveVision/Papers/davison_iccv2003/davison_iccv2003.pdf.

http://www.acfr.usyd.edu.au/publications/downloads/2002/Williams167/ifac2002Submission.pdfhttp://web.media.mit.edu/~rgupta/IROSO4jason.pdf Computational Prinicples of Mobile Robotics, Gregory Dudek and MIchael Jenkin; Cambridge University Press, Cambridge,2000, ISBN: 0-521-56021-7.

Leica SmartStation, The Integration of GPS & Total Station Technologies by Craig Hill, (Mar. 17, 2005), pp. 1-10.

Alternative Navigation for GPS Denied Areas, Navigation Monocular Slam by Mark D. Chapman et al., (Sep. 1, 2008), pp. 1-6.

Robert Grover Brown and Patrick Y.C. Hwang, Introduction to Random Signals and Applied Kalman Filtering, $3^{rd}$ edition, Wiley & Sons (1997), Chapter 10, pp. 392-415.

Farrell and Barth, The Global Positioning System and Inertial Navigation, McGraw Hill (1999), Chapter 7, pp. 241-290.

* cited by examiner

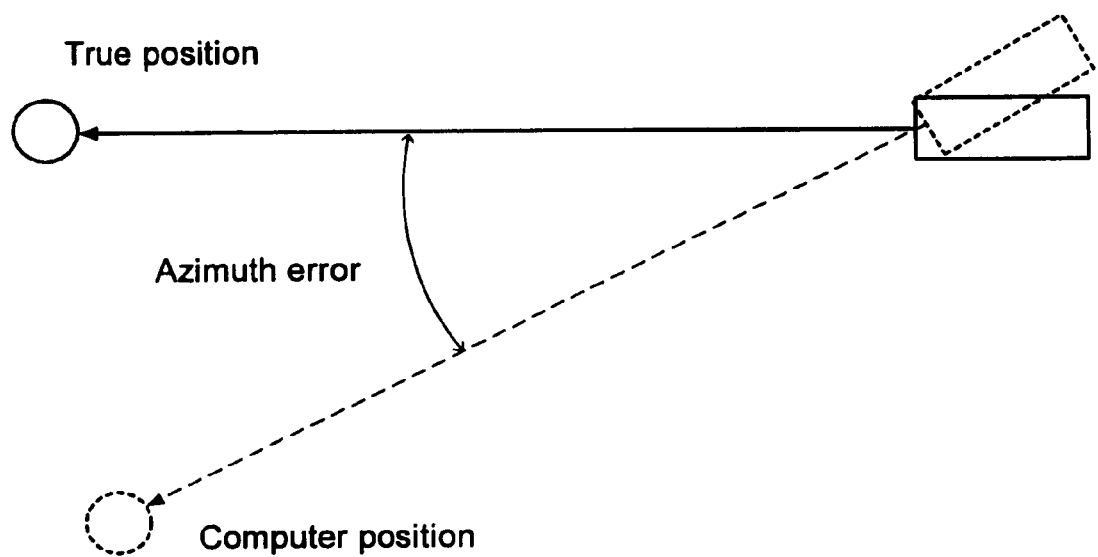
F I G. 6

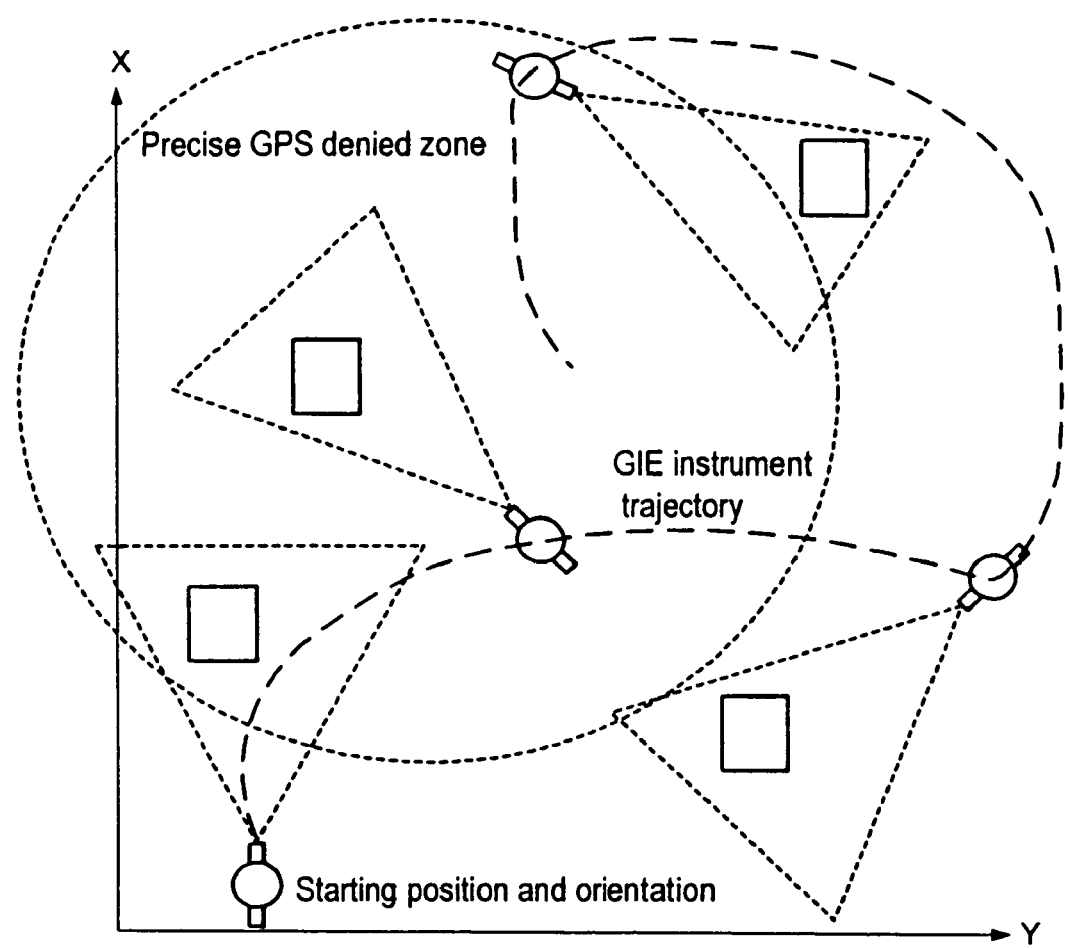
F I G. 8

LAND SURVEY SYSTEM

This application is continuation of pending U.S. application Ser. No. 12/590,908 filed Nov. 16, 2009 which was a continuation of U.S. application Ser. No. 12/313,560 filed Nov. 20, 2008, now U.S. Pat. No. 7,619,561, issued Nov. 17, 2009, which was a divisional of U.S. application Ser. No. 11/303,676 filed Dec. 15, 2005, now U.S. Pat. No. 7,541,974 issued Jun. 2, 2009.

FIELD OF THE INVENTION

The present application relates to land survey systems, and in particular to land survey systems which provide survey-grade position data, and which may be used in areas or zones where precise position information based upon the receipt and processing of satellite signals cannot be obtained because of the absence, obstruction or degradation of such signals.

BACKGROUND OF THE INVENTION

Heretofore precise positioning with a GPS survey instrument has not been effective in areas where some or all of the signals from the GPS satellites are disrupted. This problem has several dimensions that include a technical dimension, an economic dimension and a man-machine interface (MMI) dimension.

The economic dimension is the GPS survey instrument's value proposition that justifies its price of $35K-50K. The value proposition is the significant improvement in efficiency over alternative precise positioning methods that include conventional total stations (CTS), automatic total stations (ATS) and fan lasers. A GPS survey instrument requires one operator and can operate effectively over an area of up to 10 km away from a companion base receiver providing position correcting information. A CTS selling for around $10K requires a crew of two operators and has an operational range of a few hundred meters. An ATS selling for around $45K requires only one operator, but has a range limit similar to a CTS. In addition, the CTS and the ATS each requires a fairly elaborate setup per location. Fan lasers have even shorter range limits and require elaborate and time-consuming installations. Consequently, under normal circumstances, the GPS survey instrument can provide an excellent value proposition so long as it delivers reliable centimeter-level positioning needed for most survey-grade applications.

Unimpeded GPS survey instruments alone are normally able to provide surveyed position accuracy competitive with CTS, ATS, fan lasers, or traditional rod-and-chain instruments. When aided by differential or RTK data, GPS accuracy can be on the order of one centimeter (cm) for precision land survey. GPS accuracy can vary from 10 cm to one meter for lower accuracy survey applications such as cadastral survey 5, geographic information system (GIS) and seismic survey.

The accuracy of a GPS survey instrument diminishes when one or more satellite signal lines of sight pass through foliage. For example, the current generation GPS survey instrument is not reliable near trees or buildings that can shade, reflect or refract the GPS satellite signals. Such an area is hereinafter referred to as a GPS precision-denied zone. In other words, a GPS precision-denied zone is an area or region where GPS accuracy in locating a point in three dimensional space is degraded. For example, GPS accuracy may degrade from 1 cm to 3 cm in a precision land survey due to signal refraction from nearby foliage or buildings. Accordingly, although a GPS receiver may continue to provide a position solution while within a GPS precision-denied zone, it cannot reliably provide a precise survey-grade position solution having, for example, centimeter-level accuracy. If an operator foresees the need for a CTS or ATS as frequent backup because of extensive foliage in a job area, it is likely that a CTS or ATS will be selected for use on the entire job, and a GPS survey instrument would not be used. The value proposition of the GPS survey instrument thus diminishes in the presence of foliage or other satellite signal obstructions.

What is needed therefore is a technical solution that is able to provide survey-grade precision data by which objects or targets within GPS precision-denied zones may be accurately located.

SUMMARY OF THE INVENTION

A system is provided enabling a surveyor to obtain precise survey grade location information of target points within a GPS precision-denied zone. One such system involves an integrated GIE survey instrument having a GPS receiver, an inertial measurement unit (IMU), a laser electronic distance meter (EDM) and a zero velocity indicator (ZVI) switch located on a survey pole. In other integrated GIE systems an image capture device may be included for obtaining position information. The surveyor utilizes such an integrated system while transiting or traversing a GPS precision-denied zone.

This technique may be referred to as a "managed traverse." "Traversing" can mean traveling from a start point to an end point and obtaining position information along the way. Such position information typically includes present location relative to a fixed reference point, which may be the start point for the traverse. In one form, such relative position information may be obtained by an IMU which senses the distance and direction traveled with respect to the reference point. From this information present position of the instrument may be determined. In one embodiment, a method is provided for obtaining position information of a target inside a GPS precision-denied zone by moving a survey instrument having one or more position measurement system along a trajectory through the zone from a starting point outside the zone, where GPS position is enabled, to an end point also outside the zone where reliable GPS satellite signals are again available. The survey instrument obtains the surveyed positions of a plurality of intermediate points along the trajectory.

In a managed traverse, position information may be derived by a single operator from one or more of the integrated systems with no or little risk of losing positioning accuracy. Any additional work imposed upon a surveyor by a managed traverse would be significantly less than the work required to set up for and to conduct a survey with a total station. The GIE survey instrument reverts to a GPS survey instrument when it again has access to uncompromised GPS satellite signals.

The MMI with a GIE survey instrument does not differ dramatically from a GPS survey instrument. Operator familiarity and ease-of-use are preserved so that a managed traverse may be executed quickly, easily and reliably without elaborate training.

In an embodiment, a method of determining the position of a target comprises the steps of determining the position of a starting point spaced apart from the target, traversing from the starting point to the target while keeping track of positions using a tracking method that is subject to the accumulation of tracking errors. The en route accumulated errors are reduced by determining position relative to at least one known reference location.

Locating a survey object in a GPS precision-denied zone may comprise:

a. defining a first reference point near the perimeter of the zone;
b. locating a GPS receiver at a first GPS receiver location outside the zone near the first reference point;
c. determining the position of the GPS receiver at the first GPS receiver location using GPS signals;
d. determining the position of the first reference point relative to the GPS receiver at the first GPS receiver location;
e. traversing, from the first GPS receiver position into the zone, to the location of the object using a tracking method that is subject to the accumulation of errors;
f. obtaining first relative position information of the object location relative to the first reference point;
g. obtaining aiding position information to reduce the accumulation of errors obtained during at least one of steps (e) and (f); and
h. determining the location of the object using the information obtained in steps (c), (d), (e), (f) and (g).

Locating a survey object in a GPS precision-denied zone may also comprise:
a. defining first and second reference points near the perimeter of the zone;
b. locating a GPS receiver at a first GPS receiver location outside the zone near the first reference point;
c. determining the position of the GPS receiver, at the first GPS receiver location using GPS signals;
d. determining the position of the first reference point relative to the GPS receiver at the first GPS receiver location;
e. traversing, from the first GPS receiver position into the zone, to the location of the object using a tracking method that is subject to the accumulation of errors;
f. obtaining first relative position information of the object location relative to the first reference point;
g. traversing from the object location to a second GPS receiver position outside the zone and near the second reference point using a tracking method that is subject to the accumulation of errors,
h. locating a GPS receiver at the second GPS receiver location;
i. determining the position of the GPS receiver at the second GPS receiver location using GPS signals;
j. determining the position of the second reference point relative to the GPS receiver at the second receiver location;
k. obtaining second relative position information of the object location relative to the second reference point;
l. obtaining aiding position information to reduce the accumulation of errors obtained during at least one of steps (e), (f), (g) and (k); and
m. determining the location of the object using the information obtained in steps (c), (d), (f), (i), (j), (k) and (l).

A survey system for locating a survey object in GPS precision-denied zone may comprise a GPS receiver for determining the position of a starting point near the perimeter of the zone. A measurement system is configured to obtain relative position information as one traverses from the starting point to the target. The measurement system is subject to the accumulation of tracking errors during said traversal. Aiding position information is obtained to reduce the accumulation of errors during the traversal. A processing system is configured to compute the position of the target using the starting point position, the relative position information, and the aiding position information, whereby the position of the target so computed has greater precision than that computed using only relative position information.

A survey system for locating a survey object in a GPS precision-denied zone may also comprise a position locator configured to determine the position of a first reference point near a perimeter of the zone using a GPS receiver and GPS signals. The position locator obtains relative position information of the object location relative to the first reference point during a traversal inside the zone from the first reference point toward the object. Tracking errors are accumulated during the traversal. An aiding device is configured to reduce the accumulated tracking errors to the target by determining position relative to at least one reference location whose position is known.

In an embodiment, a surveying system for determining the position of a target may comprise a position locator for determining the position of a starting point spaced apart from the target point. The position locater keeps track of positions as one traverses from the starting point to the target, and uses a tracking method which is subject to the accumulation of tracking errors during the traversing. An aiding device is configured to reduce the accumulated tracking errors during traversing to the target inside the zone by determining position relative to at least one reference location whose position is known.

In an embodiment, a land survey system may comprise an imaging device configured to capture image data representing a sequence of images. A position measurement system is configured to obtain position information. The position measurement system is subject to the accumulation of tracking errors. A processing system is configured to compute the location of the measurement system using the image data to reduce accumulated errors of the position measurement system.

BRIEF DESCRIPTION OF THE DRAWINGS

For a further understanding of the subject matter of the present application, reference may be had to the accompanying drawings in which:

FIG. 6 shows an example of a position error due to azimuth error;
FIG. 8 shows a typical SLAM navigation through field of targets, either naturally occurring or placed by the operator.

DETAILED DESCRIPTION OF THE EMBODIMENTS

Figure 1:
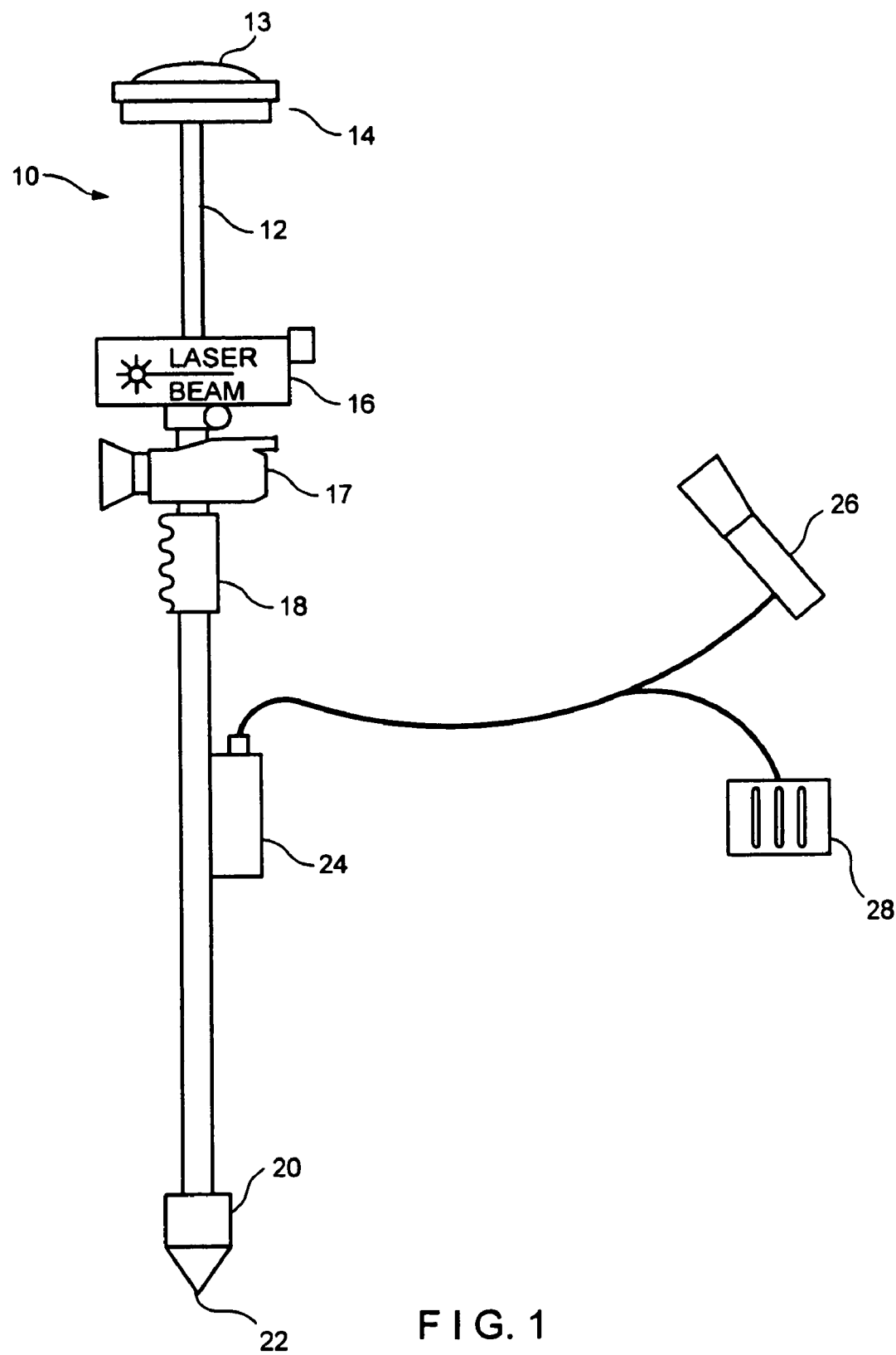
FIG. 1 shows a GIE survey instrument.

A method and system of determining the position of a survey target is disclosed in which the location of a starting point spaced apart from a survey object target is determined. A managed traverse is effected from the starting point to the survey target. Position information is recorded during the traverse using a position measurement system that is subject to the accumulation of tracking errors. In an embodiment, the survey target is located in a GPS precision-denied area or zone. During a managed traverse, accumulated position errors are reduced by a position measurement system providing aiding position information. In an embodiment, the aiding position information is determined relative to at least one known reference location, which may be the known starting point. Alternatively, the reference location may different and spaced apart from the starting point.

The location of the starting point may be determined by a GPS receiver situated where GPS satellite signals are not obstructed. When a traverse is made from the starting point through a region in which precise survey-grade position information cannot be obtained using GPS, the tracking position information may be obtained by at least a position measuring system that may be subject to the accumulation of en route position tracking errors, such as an IMU/INS. In an embodiment, position errors accumulated during a traverse may be corrected by position aiding information obtained from an EDM or from an image capture device, such as a video camera. Alternatively, in one embodiment, an IMU or an EDM may be used to obtain position aiding information for correcting position tracking errors accumulated by an image capture device.

In one embodiment, an EDM determines the position of a reference location relative to a GPS receiver situated where GPS satellite signals are unobstructed. A retro-reflector may be placed at the known reference location. The EDM may also obtain position information for a survey object location relative to the known reference location when the survey object location is within a GPS precision-denied zone. A retro-reflector may be placed at the location determined for the survey object. The location of the survey object may be determined using a smoothed estimation process which combines forward and reverse time estimation processes to reduce position error.

In one embodiment, at least one position measurement system utilized during a managed traverse may be an image capture device. In that case, position information is obtained by capturing sequential images as a result of the movement of the image capture device from a first location to a second location. A survey pole may be used with a GPS receiver and EDM mounted thereon. The survey pole may have a GPS receiver and IMU mounted thereon. The survey pole may have a GPS receiver, EDM, IMU and an image capture device mounted thereon.

A position measurement system may obtain relative position information of a plurality of intermediate reference points as a traverse is made from the starting point, through a GPS precision-denied zone to the survey object target. In such a system, the position information at each point is relative to the position information defining the position of the previous point. A position measurement system may obtain position aiding information for at least one of the intermediate reference points by obtaining relative position data from an intermediate reference point to the known starting point or to a known reference point that is not the starting point.

Referring now to FIG. 1, there is depicted an embodiment of a GIE survey instrument 10 which comprises a survey pole 12, a GPS receiver and antenna 13 and one or more of a position measurement system such as an IMU assembly 14, an EDM 16 having a laser beam with visual sighting, and an image capture device such as a camera 17. The pole 12 has a hand grip 18, a zero velocity indicator switch (ZVI) 20 at the bottom, a ground contact spike 22, and an electronics module 24 to which is connected a data entry unit 26 and battery module 28. The IMU assembly 14 and the image capture device 17 are capable of providing inertial navigation position measurements. The electronics module 24 may contain a processor for processing the position and other data. An IMU would contain accelerometers and gyros, and the electronics for digitizing the IMU data. To generate an INS solution, a processing computer may be provided as a component of the electronics module 24 and, in an embodiment, may utilize one or more managed traverse in-field network adjustment algorithms for the GIE instrument.

The EDM 16 contains a visual sighting telescope by which the operator or surveyor measures range to a survey target. The orientation of the pole may be manipulated by the operator to aid in aiming of the telescope. In an embodiment, an EDM telescope that can be sighted separately from the orientation of the pole may be utilized, and a pair of shaft encoders may be provided to measure the EDM orientation angles with respect to those of the pole.

Figure 3:
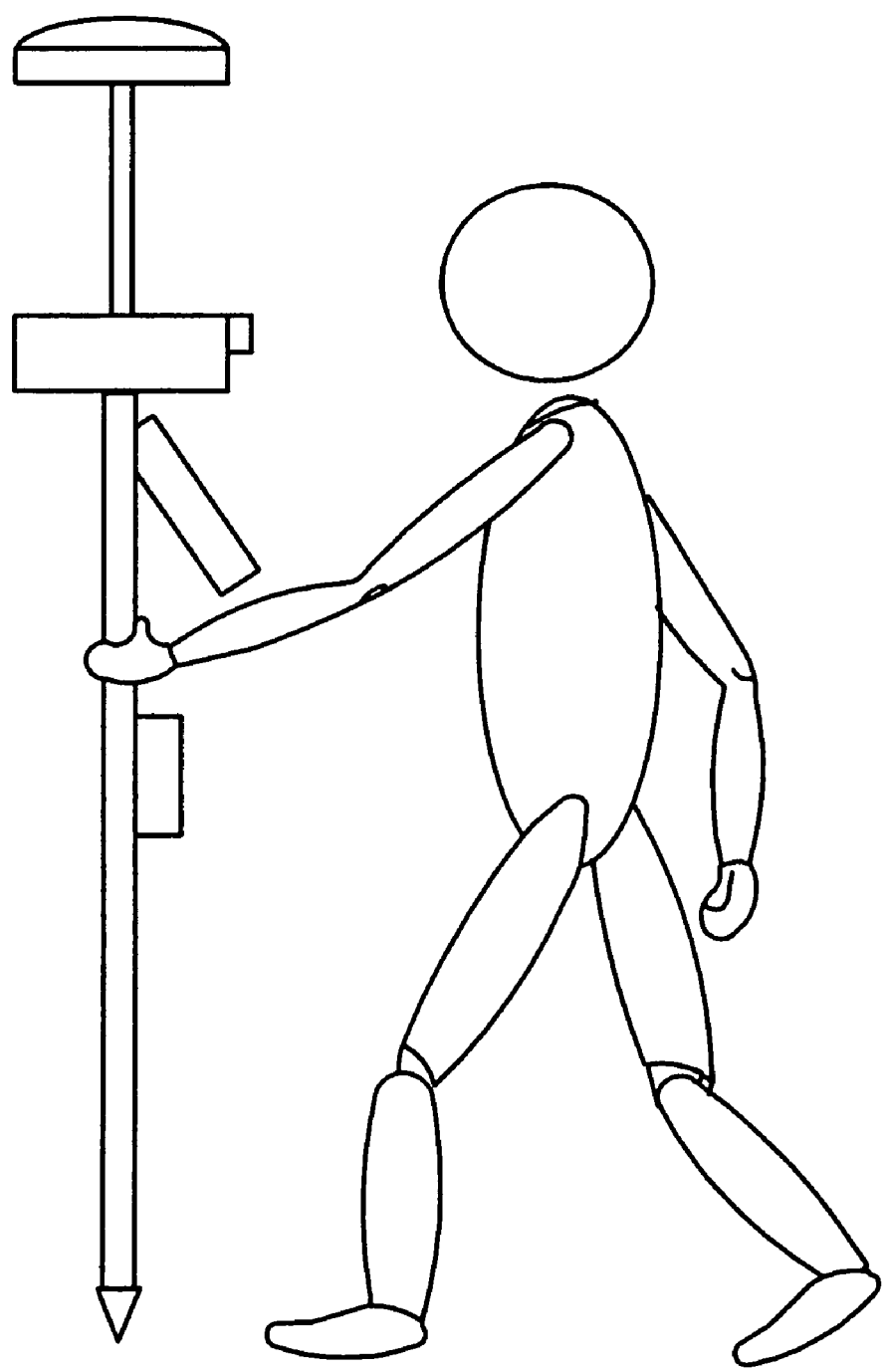
FIG. 3 shows a GIE survey instrument usage.

When the GIE survey instrument 10 has clear access to GPS satellite signals, the GPS sensor provides precise survey grade location information and the operator does not need to operate the EDM or ZVI. When GPS satellite signals are obstructed, the GIE survey instrument 10 is operating in a GPS precision-denied zone. The operator manipulates the instrument like a walking stick navigator (WSN) disclosed in my prior U.S. Pat. No. 6,853,909, which is incorporated by reference herein. FIG. 3 hereof shows a WSN being carried by an operator.

When the survey system is manipulated as a WSN through a managed traverse, position measurement systems such as an EDM, an IMU or an image capture device may be used to obtain periodic position measurements. In the WSN mode, when the ground spike connects with the ground, the ZVI switch 20 closes and thereby signals to processing software in electronics module 24 that the ground spike 22 is stationary at its contact point with the ground. In the WSN mode appropriate processing software makes use of the zero velocity information to control accumulation of velocity errors, as described in my U.S. Pat. No. 6,853,909.

Figure 2:
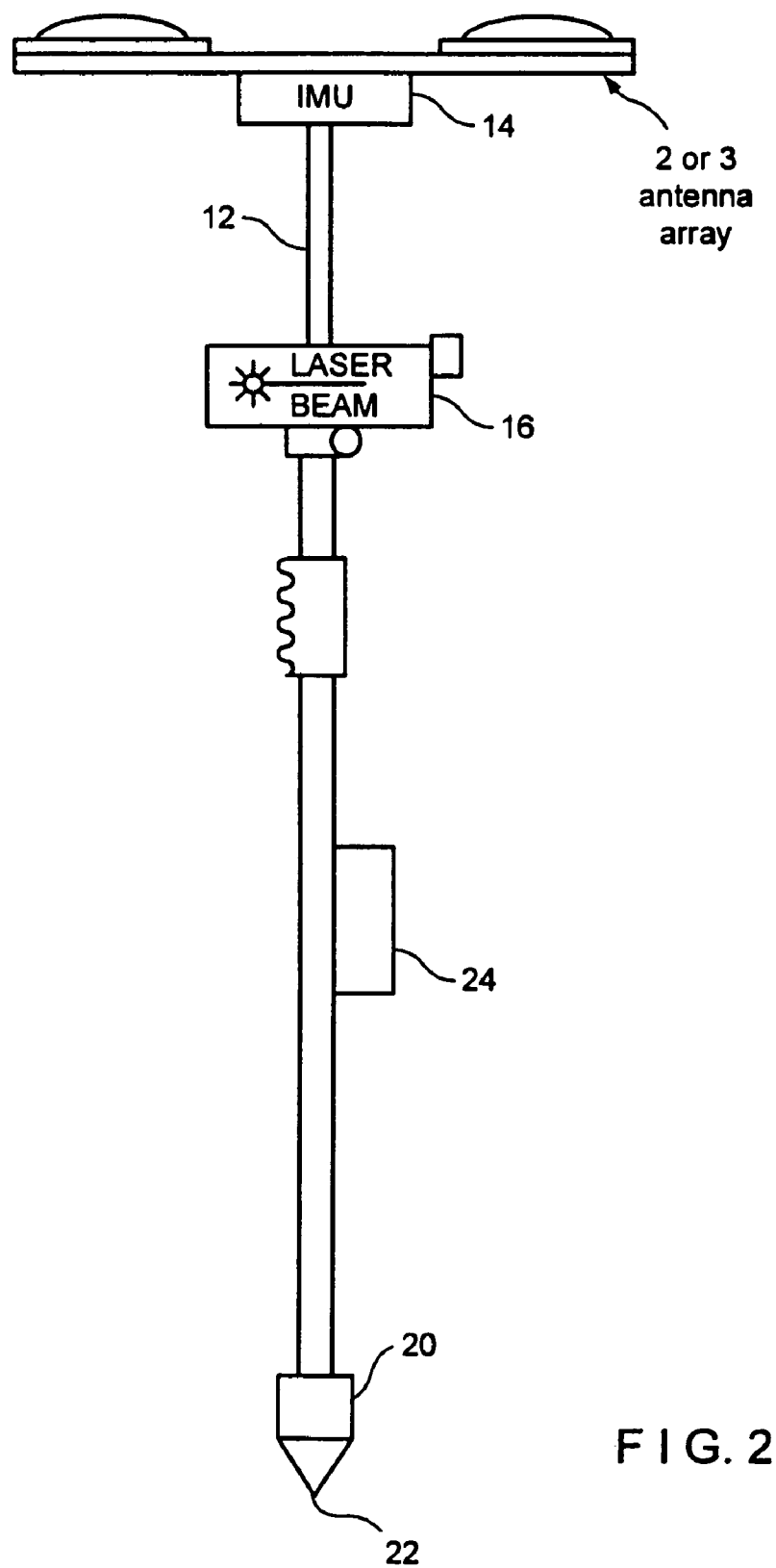
FIG. 2 shows a GIE survey instrument with GPS attitude array.

With reference to FIG. 2, there is depicted a variation of a GIE survey instrument that includes a two antenna GPS attitude array to aid other position measuring systems on the pole 12 when GPS satellite signals are not disrupted. A two-antenna array provides heading information, and is typically all that is required to obtain fast heading alignment data and continuous heading error control. In one embodiment, roll and pitch are measured using accelerometers (not shown) contained within the IMU assembly 14. It will be understood that the GIE instrument may also have a three-antenna GPS attitude array. In the absence of an IMU, a three-antenna attitude array provides a complete orientation solution.

Figure 4:
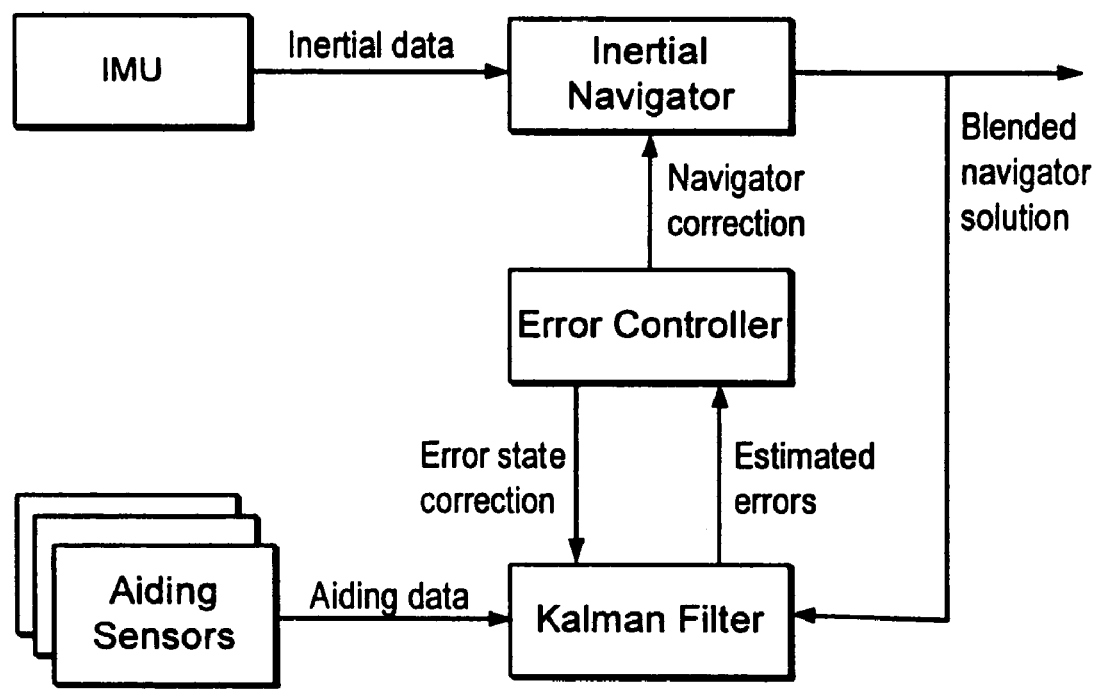
FIG. 4 shows an aided inertial navigation architecture.

With reference to FIG. 4, a block diagram depicts an embodiment of the architecture of a GIE survey instrument having an aided inertial position measurement system or navigator. The inertial position data is provided by an IMU. Aiding navigation data may be provided by a GPS receiver, a ZVI an EDM or an image capture device. The inertial navigator processes equations of motion using acceleration and angular data supplied by accelerometer and gyro components of the IMU. The INS solution essentially comprises the IMU position, velocity and orientation (roll, pitch and heading) based upon the location and orientation of the survey pole. The orientation of the IMU can be used as pointing angles for a laser component of the EDM. Consequently the GIE survey instrument can compute the polar coordinates of a target point with respect to its own position using the IMU orientation and EDM range measurement. A Kalman filter may be utilized for blending position data from the IMU with aiding data to provide correction information for the inertial navigation system thereby to regulate position and orientation errors.

Figure 5:
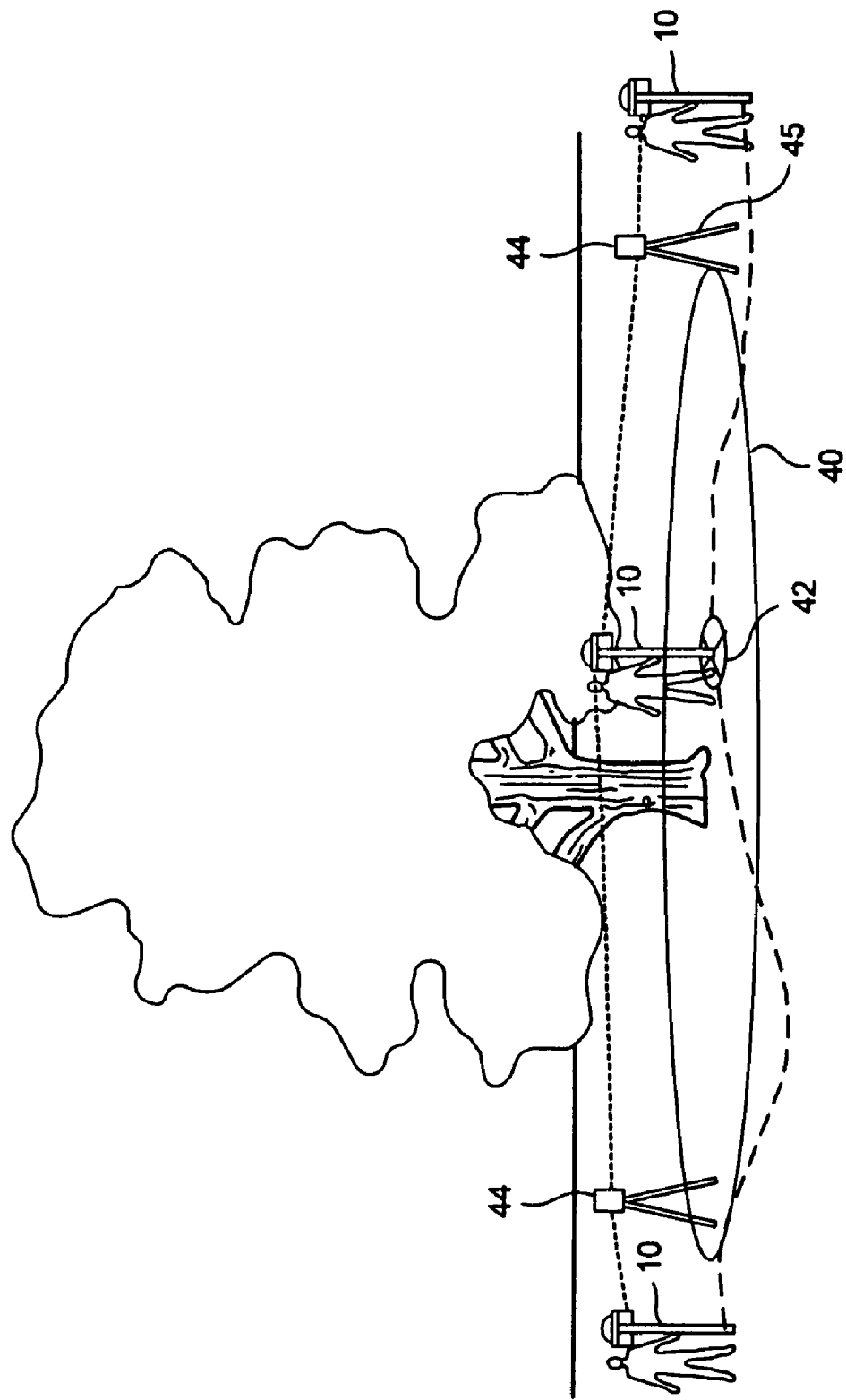
FIG. 5 shows a managed traverse through a GPS precision-denied zone caused by a tree, and a target to be surveyed located under the tree.

With reference to FIG. 5, an embodiment of a managed traverse to a survey target point 42 to be surveyed under a tree situated within a GPS precision-denied zone is schematically illustrated. The boundary of a GPS precision-denied zone is shown by a circle 40. In this embodiment, the operator places two or more retro-reflectors 44 near (within or without) the perimeter of the GPS precision-denied zone. The retro-reflectors may be mounted on tripods 45 to be self-supporting.

The retro-reflectors may be spheres such as ping pong balls. The advantage of using a sphere as a ranging target is that the distance to the sphere is unbiased from any direction as measured by sighting the laser component of an EDM. However, it will be understood that that the laser is always sighted to the same sphere latitude and the sphere does not become angularly displaced during the survey process.

In one embodiment, the operator places the retro-reflector supporting tripods on sufficiently solid ground so that they do not move, in a pattern that provides reasonable trilateration geometry beyond and within the boundary 40 of the GPS precision-denied zone. The operator then surveys the positions of the retro-reflectors 44 using the GIE survey instrument 10 outside of the GPS precision-denied zone where the position measurements of the GIE survey instrument accuracy are at the centimeter level. The GIE survey instrument 10 computes its roll, pitch and heading angles and the EDM is used to obtain ranging information with respect to each of the retro-reflectors. The instrument computes the relative positions of the retro-reflectors 44 in terms of polar coordinates (azimuth, elevation, range) and then computes the positions of the retro-reflectors 44 based upon the precise GIE survey instrument position. The retro-reflector position error due to roll, pitch or azimuth error will be proportionally related to distance between the GIE instrument and the retro-reflector. It will be understood that alternative position measurement systems may be used such as a technique known as simultaneous location and mapping (SLAM). SLAM, discussed in more detail below, is an image capture system that provides position information derived from image processing of images taken of a target periodically at different times and from different locations.

Typically azimuth error is the largest source of error in a polar coordinate measurement of relative position. The operator can perform two or more measurements of the retro-reflector position from different GIE survey instrument positions to obtain statistical averaging of errors and to eliminate the effect of azimuth error by using range trilateration. The operator records the retro-reflector positions in the data logger 26 for future use.

The operator then begins a managed traverse of the GPS precision-denied zone 40, and accordingly manipulates the GIE survey instrument in walking stick fashion to control the orientation (roll, pitch and azimuth) errors in the GIE survey instrument as described in my prior U.S. Pat. No. 6,853,909. The operator also periodically measures ranges to one or more of the retro-reflectors 44 to obtain position of the GIE instrument relative to the known positions of the retro-reflectors. The accumulation of position tracking errors in the position measurement systems of the GIE instrument may thereby be reduced.

When the operator reaches the survey target 42, the ground spike 22 is placed on the target point 42 and the range to each of the retro-reflectors 44 is determined. Since the location of the retro-reflectors has been precisely determined, the position of the GIE survey instrument relative to each of the retro-reflectors permits the computation of the precise location of the survey target point. The operator may then exit the GPS precision-denied zone 40 taking periodic measurements described above so as further to provide control data for reducing orientation errors affecting position information.

With reference to FIG. 6, there is depicted a schematic representation of azimuth error that can accumulate with a dead-reckoning position measurement system. In particular, such error will accumulate as a dead-reckoning system is used during a managed traverse without the benefit of aiding position information from other position measurement sources. In one embodiment, a GIE survey instrument 10 may utilize laser range aiding to control such position errors during a managed traverse.

Figure 7:
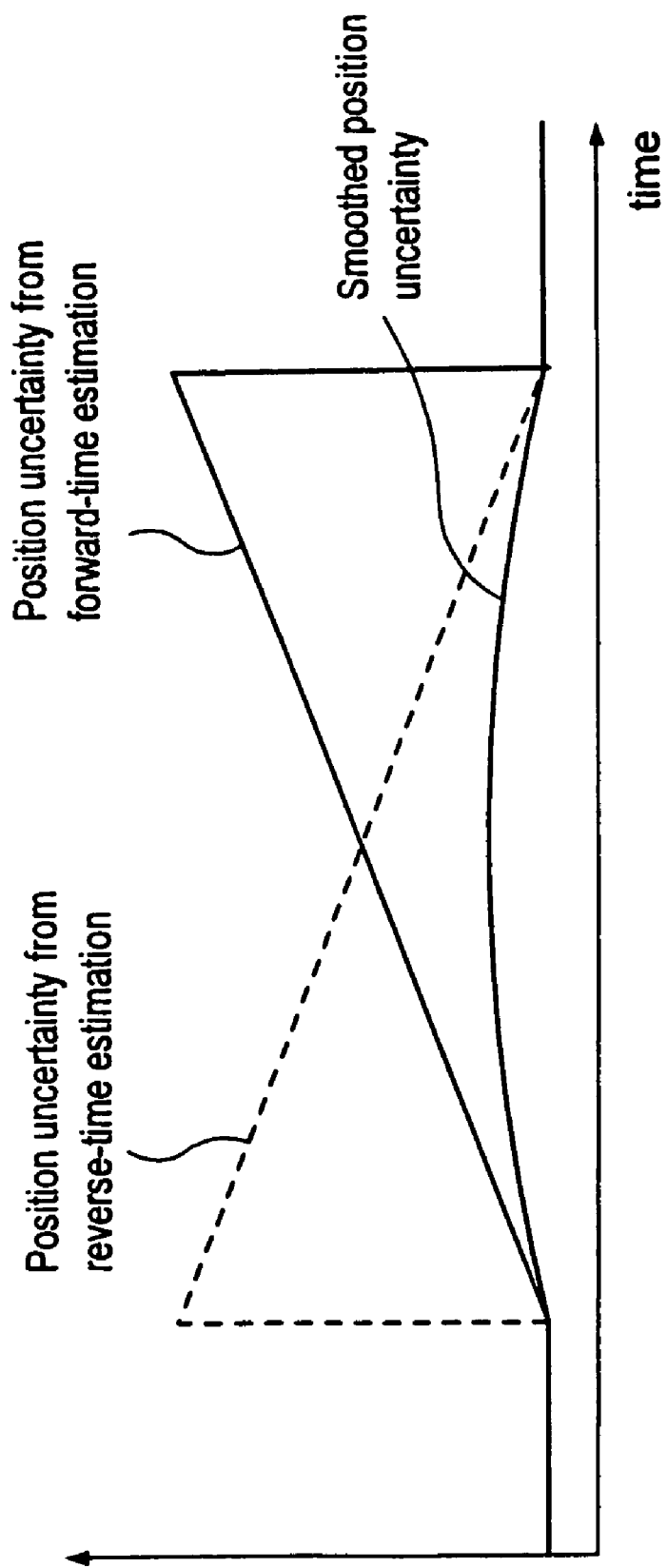
FIG. 7 shows an example of a smoothed position error.

FIG. 7 graphically depicts a smoothed position uncertainty curve resulting from forward-time and reverse-time signal processing. The forward-time estimation process combines current and past position uncertainty data derived from aiding sensors. The reverse-time estimation process uses current and future information from aiding sensors, and hence can run only in post-processing from recorded data. The smoothed position error is smaller than either of the forward-time and reverse-time position errors, a consequence of using all past, present and future uncertainty data at each time point.

Accelerometers and gyros in an IMU contain instrument errors such as biases, scale factor errors and non-orthogonality errors that the Kalman filter attempts to estimate using currently available aiding data. For example, as indicated above, a dead-reckoning measurement system will accumulate an azimuth error due to the bias in the azimuth gyro that the Kalman filter has been unable to calibrate. Smoothing, by using future information to update a current estimate, is a common technique in least-squares estimation. This involves an estimation process that runs backwards on the data to carry future information to a current estimate. My prior U.S. Pat. No. 6,834,234, incorporated by reference herein, relates to in-field network adjustment by which a smoothing process is used on position data segments in GPS precision-denied zones.

In an embodiment, a managed traverse may utilize in-field network adjustment to bring precise GPS position information from both ends of the managed traverse to the target position estimation in the middle of the traverse. A GIE survey instrument implementing in-field network adjustment will record all inertial and aiding data during a managed traverse, and will compute a smoothed target survey position once it transits out of the GPS precision-denied zone. Precise GPS position fixes at either end of the managed traverse will significantly improve the position accuracy in the middle of the traverse. In this case, the improvement will come from the smoothed orientation error combined with EDM range measurements.

SLAM, referred to above, may be employed as an alternative to or in addition to other position measurement systems. SLAM utilizes an image capture technique which may employ a mobile robot or unmanned vehicle to navigate in an unfamiliar space. In particular, SLAM uses sequences of images taken at different times and locations from one or more video cameras. Each image identifies fixed features and the system then generates a map of these fixed features from which the location of the camera(s) may be determined. Two key image processing techniques are applied. One is image segmentation and feature extraction. SLAM uses this to identify particular features that are known to be stationary and hence valid reference points in 3D space. Typical choices are trees in an outdoor setting or light fixtures in an indoor setting. The other technique is stereo imaging to extract depth and hence range-to-feature information. SLAM generates a map of the features in a 3D coordinate grid as it images them from different positions, and thereby determines the camera position in that grid. The mapping and self-location process is implemented in a Kalman filter that estimates all variables. Once SLAM has identified reference points via feature extraction, the method of positioning is similar to that employed by previously described positioning measurement systems. In one embodiment, range extraction is done using stereo imaging from multiple overlapping 2D images.

SLAM techniques can be used in place of or in addition to the EDM in a GIE survey instrument. The instrument may include a video camera 17 with sufficiently small pixel size on the order of less than 2 cm via either a large CCD or a narrow field of view (FOV). The narrow FOV is the less expensive approach but can limit the utility of the instrument since the operator must manually select features and aim the camera at them. A wide FOV allows the camera to capture features automatically, but requires a fine resolution and hence a large CCD array to obtain a centimeter-level pixel size. In an embodiment, the SLAM position measuring instrument would include a processing algorithm that inputs images at a frame rate dictated by the instrument dynamics (5 frames per second should be adequate for a hand-held instrument) and outputs the positions of the fixed targets it has identified and the instrument position all in a relative Cartesian coordinate frame whose x-y axis is determined by the initial orientation of the instrument. A Kalman filter would then use the SLAM position information in addition to inertial, GPS and zero velocity data, when available, to compute position and to update the SLAM processor's estimates of fixed target positions. If the GIE survey instrument is operated in full RTK mode outside of a GPS precision-denied zone, then all target position errors can be reduced to 1-2 cm. When the GIE survey instrument enters a GPS precision-denied zone, then SLAM plus inertial orientation data may provide the position information to maintain RTK position accuracy.

SLAM image segmentation and feature extraction processes can be designed to accommodate particular features, such as an unusual shape and/or color. In an embodiment, the operator may deploy tripods carrying one or more of such features in place of the retro-reflectors described previously. This would ensure that the desired features for SLAM are always present.

FIG. 8 is a schematic drawing depicting a GIE survey instrument navigating through a field of targets, either naturally occurring or placed by the operator. A proper SLAM-based GIE survey instrument mission should be designed so that the camera can view the targets with sufficiently strong geometry to allow their simultaneous measurement of the targets and the instrument.

The following references, incorporated by reference herein, provide additional information relative to the embodiments disclosed herein:
1. George Siouris, *Aerospace Avionics Systems, A Modern Synthesis*, Academic Press 1993.
2. Oleg Salychev, *Inertial Systems in Navigation and Geophysics*, Bauman MSTU Press, Moscow 1998.
3. U.S. Pat. No. 6,853,909.
4. U.S. Pat. No. 6,834,234.
5. U.S. Pat. No. 6,266,628
6. U.S. Pat. No. 5,268,695
7. U.S. Pat. No. 5,561,432
8. *Principles of Robot Motion*, by Howie Choset, et al The MIT Press (Jun. 4, 2005), ISBN: 0262033275.
9. Introduction to Autonomous Mobile Roberts (Intelligent Robotics and Autoromous Agents), by Roland Siegwart and Illah R. Nourbakhsh, The MIT Press (Apr. 1, 2004), ISBN: 026219502X.
10. Computational Principles of Mobile Robotics, by Gregory Dudek and Michael Jenkin.
11. Some links to SLAM literature on the Internet include:
http://www.cas.kth.se/SLAM/Presentations/hdw-slides.pdf
http://www.robots.ox.ac.uk/ActiveVision/Papers/davison_iccv2003/davison_iccv2003.pdf
http://www.acffiusyd.edu.au/publications/downloads/2002/Williams167/ifac2002Submission.pdf
http://web.media.mit.edu/~rgupta/IROS04jason.pdf The following is a list of acronyms that may have been used in the description of the embodiments above, along with their meanings:
AIA antenna/IMU assembly
AINS aided inertial navigation system
ATS automatic total station
CCD changed coupled device
CTS conventional total station
EDM electronic distance meter
FOV field of view
GIE GPS—inertial-EDM
GIS geographic information system
GPS global positioning system
IFNA in-field field network adjustment
IMU inertial measurement unit
INS inertial navigation system
MMI man-machine interface
RTK real time kinematic
SLAM simultaneous location and mapping
TBD to be determined
WSN walking stick navigator
ZVI zero velocity indicator Although illustrative embodiments of the invention have been shown and described, it is to be understood that various modifications and substitutions may be made by those skilled in the art without departing from the novel spirit and scope of the present invention.

What is claimed is:

1. A land-based survey system, comprising:
a vision positioning system configured to capture image data representing a sequence of images, said sequence of images including a plurality of non-common images of each of at least two different spaced apart fixed objects, said image data including known distance information;
a processor configured to use said image data to derive position information for said vision positioning system based upon differences between images in said sequence of images, said differences being derived from said image data obtained from each of said spaced apart fixed objects;
a position measurement system associated with said vision positioning system and configured continuously to obtain position information for said position measurement system that is based upon a known reference point and is subject to the accumulation of errors; and
a computer configured to use said position information derived from said vision positioning system to reduce accumulated errors of said position measurement system.

2. The land-based survey system of claim 1 in which said position measurement system comprises a dead-reckoning system based upon an IMU.

3. The land-based survey system of claim 1 in which said position measurement system comprises an EDM.

4. The land-based survey system of claim 1 in which said vision positioning system comprises one or more video cameras.

5. The land-based survey system of claim 1 in which said vision positioning system is adapted to capture said image data from one location and from another location.

6. The land-based survey system of claim 5 in which said vision positioning system is adapted to be moved from said one location to said another location.

7. The land-based survey system of claim 6 in which said position measurement system is adapted to be moved from said one location to said another location.

8. The land-based survey system of claim 1 in which said computer is adapted to provide blended position solutions based upon input of said position information obtained from said position measurement system and said image data.

9. The land-based survey system of claim 8 comprising an antenna and a GNSS receiver to provide GNSS position data, said computer being configured to correct position information for said position measurement system using said GNSS position data and said image data.

10. The land-based survey system of claim 9 in which said computer is adapted to provide blended position solutions based upon input of said position information obtained from said position measurement system, said GNSS position data and said image data.

11. The land-based survey system of claim 8 in which said blended solutions are represented by output from a Kalman filter.

12. The land-based survey system of claim 10 in which said blended solutions are represented by output from a Kalman filter.

13. The land-based survey system of claim 5 in which said known distance information consists of the distance between said one location and said another location.

14. The land-based survey system of claim 1 in which said known distance information consists of the distance between said at least two different spaced apart fixed objects.

* * * * *